Patented Oct. 13, 1925.

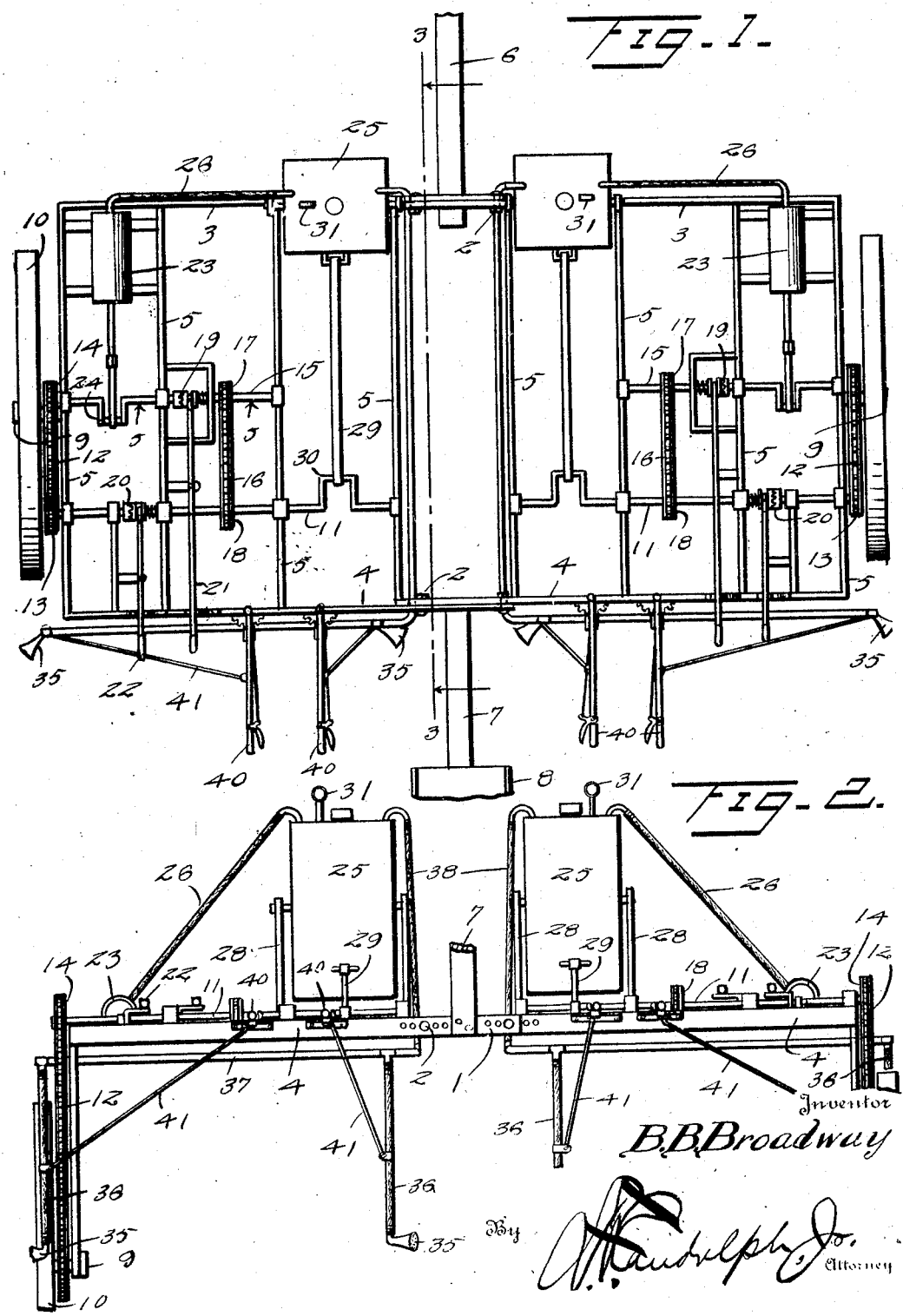

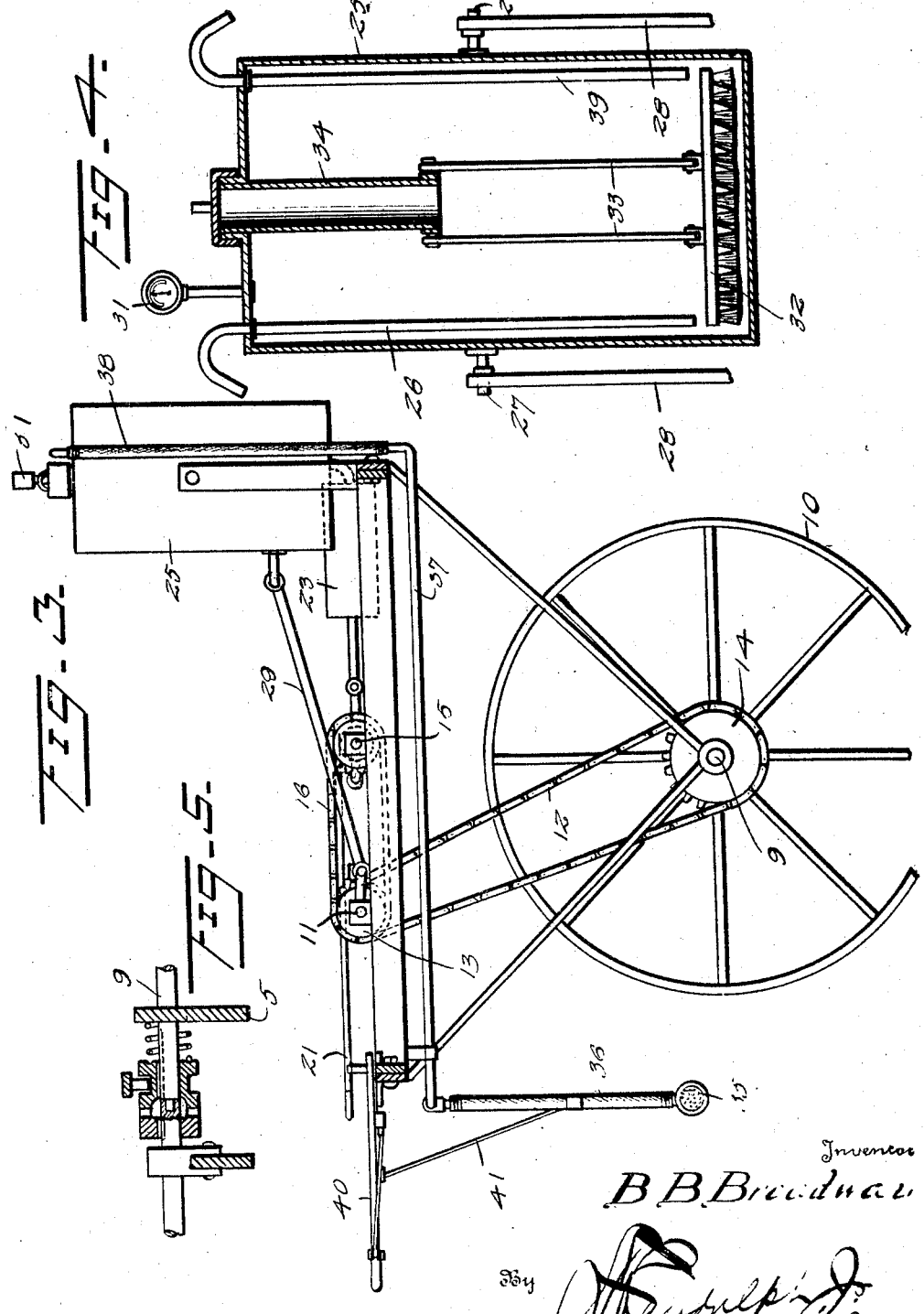

1,557,412

UNITED STATES PATENT OFFICE.

BENNIE B. BROADWAY, OF SUMMERTON, SOUTH CAROLINA.

SPRAYING MACHINE.

Application filed March 13, 1924. Serial No. 699,025.

*To all whom it may concern:*

Be it known that I, BENNIE B. BROADWAY, a citizen of the United States, residing at Summerton, in the county of Clarendon and State of South Carolina, have invented certain new and useful Improvements in Spraying Machines; and I do hereby declare the following to be a full, clear, and exact description of the invention, such as will enable others, skilled in the art to which it appertains, to make and use the same.

The present invention has relation to means whereby an insecticide may be sprayed upon plants such as cotton, tobacco, potatoes and the like, which are infested with insects and worms, whereby to destroy the same, and has for its object to provide a machine which admits of the spraying a solution without clogging the pipes and spray nozzles and which is adjustable to varying distances between rows of plants and which embodies a clutch mechanism whereby different parts of the mechanism may be thrown into or out of gear, as required.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a top plan view of a spraying machine embodying the invention,

Figure 2 is a rear view thereof, parts being broken away,

Figure 3 is a vertical longitudinal sectional view of the machine on the line 3—3 of Figure 1, looking in the direction of the arrows, Figure 4 is an enlarged sectional view of the tank containing the insecticide to be distributed, and Figure 5 is an enlarged sectional view on the line 5—5 of Figure 1.

Corresponding and like parts are referred to in the following description and designated in the several views of the drawings by like reference characters.

As shown most clearly in Figures 1 and 2, the main frame is of sectional formation to admit of the width of the machine being varied to adapt the same to rows of plants of varying distances. The transversely disposed frame bars overlap and each is formed with a plurality of openings 1 which are adapted to receive bolts 2 or like fastenings whereby the sections of the frame are made secure in the required adjusted position. Each section of the main frame comprises a front bar 3, a rear bar 4, and a plurality of longitudinal bars 5. The inner ends of the bars 3 and 4 project and are adapted to overlap to admit of adjustment of the frame in the manner stated. The numeral 6 designates a pole or tongue to which a team of horses may be hitched for drawing the machine over the field. A standard 7 at the rear of the frame is provided with a seat 8. Each section of the frame is similarly equipped and provided with an axle 9, the outer end of which receives a drive wheel 10 which is connected to a transversely disposed shaft 11 by means of sprocket gearing embodying a drive chain 12 and sprocket wheels 13 and 14, the sprocket wheel 13 being mounted upon the shaft 11 and the sprocket wheel 14 on the axle 9. A shaft 15 paralleling the shaft 11 is connected thereto by sprocket gearing which includes a drive chain 16 and sprocket wheels 17 and 18 mounted upon the respective shafts 15 and 11. A clutch 19 associated with the shaft 15 admits of throwing the same into and out of gear and a corresponding clutch 20 associated with the shaft 11 admits of throwing the latter shaft into and out of gear. A lever 21 is provided for operating the clutch 19 and a similar lever 22 coacts with the clutch 20, whereby the same may be thrown into or out of gear as required.

An air pump 23 has its piston connected with the crank portion 24 of the shaft 15 and this pump supplies air to a tank 25 by means of a pipe 26. The tank 25 may be of any construction and capacity and is adapted to contain the insecticide. The tank is mounted to receive an oscillatory movement and is provided at opposite sides with trunnions 27 which obtain bearings in uprights 28. A rod 29 connects the tank 25 with the crank portion 30 of the shaft 11 and in this manner an oscillatory movement is imparted to the tank when the machine is in operation. A pressure gage 31 indicates the air pressure within the tank so that the operator may know when to throw the air pump out of action by unshipping the clutch 19. An agitator is arranged within the tank to insure a uniform mixture of the ingredients comprising the insecticide. As shown, the agitator consists of a brush 32, links 33 and a tube 34, the latter being connected to the top of the tank and the links 33 pivotally connecting the brush to the lower end of the tube. The construction is such as to admit of the parts being readily removed through the opening in the top of the tank into which the tube 34 is fitted.

The distributing mechanism comprises spray nozzles 35, flexible tubes 36, a pipe 37 and a flexible tube 38 which is in communication with a pipe 39 disposed within the tank and reaching to within a short distance of the bottom thereof. The spray nozzles 35 may be adjusted laterally as required, and for this purpose a lever 40 is connected by means of a rod 41 with each of the tubes 36 and by proper manipulation of the levers 40, the tubes 36 may be adjusted to position the spray nozzles 35 to insure a spraying of the plants to be treated.

What is claimed is:

A spraying machine of the ground wheel type, comprising a wheel supported frame, a tank mounted thereon for swinging movement on a horizontal axis, a rotatable element geared to the wheels of said frame, a pitman connection between said element and said tank whereby the latter will be oscillated as the machine travels, an air pump in communication with the tank, and a driving connection under clutch control between said element and said air pump.

In testimony whereof I affix my signature.

BENNIE B. BROADWAY.